United States Patent [19]

Eckle

[11] 4,043,697
[45] Aug. 23, 1977

[54] MOUNTINGS FOR BORING TOOL BITS

[75] Inventor: Otto Eckle, Loechgau, Germany

[73] Assignee: Komet Stahlhalter- und Werkzeugfabrik, Robert Breuning GmbH, Besigheim, Germany

[21] Appl. No.: 703,430

[22] Filed: July 8, 1976

[30] Foreign Application Priority Data

July 26, 1975 Germany .................. 7523920[U]

[51] Int. Cl.² .................................. B23B 29/02
[52] U.S. Cl. .............................. 408/182; 408/233; 29/105 A
[58] Field of Search ............. 408/181, 182, 185, 153, 408/227, 228, 231, 233; 29/105 R, 105 A

[56] References Cited

U.S. PATENT DOCUMENTS

| 2,074,459 | 3/1937 | Cole et al. | 29/105 A |
| 2,466,233 | 4/1949 | Harris, Sr. | 29/105 A |
| 3,856,427 | 12/1974 | Lovendahl | 408/182 |

FOREIGN PATENT DOCUMENTS

| 808,470 | 2/1959 | United Kingdom | 29/105 R |

Primary Examiner—Leonidas Vlachos
Attorney, Agent, or Firm—Blanchard, Flynn, Thiel, Boutell & Tanis

[57] ABSTRACT

A mounting for a pair of boring tool cutting bits, the mounting being such that the two cutting bits, when present, project beyond a forward end of a mounting member and are displaced through 180° relative to each other. Each of the tool cutting bits is mounted on a respective cutting bit carrier which is radially adjustable relative to and guided on teeth on the mounting member. The teeth extend in the direction of adjustment at right angles to the rotary axis of the mounting member and are parallel. The cutting bit carrier is also adjustable radially by means of an adjusting screw engaging the carrier and extending in the direction of the teeth. The teeth of the two cutting bit cariers is provided on the forward face of the mounting member in a common radial plane with continuous teeth running across the whole breadth of the forward face. The cutting bit carriers have similar teeth on their rear ends facing towards the forward face. The clamping screws are arranged parallel to the rotary axis.

12 Claims, 4 Drawing Figures

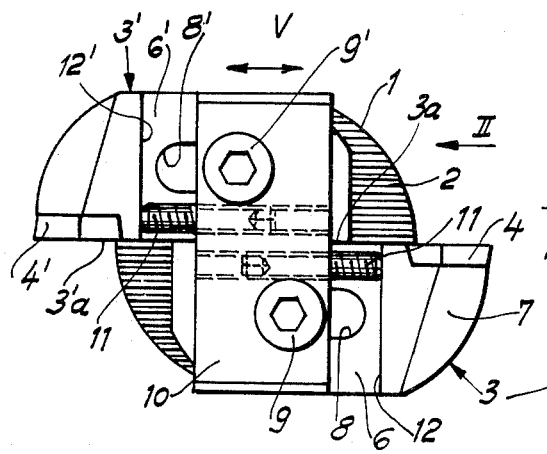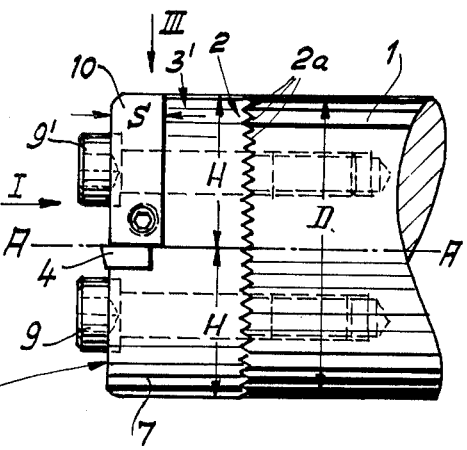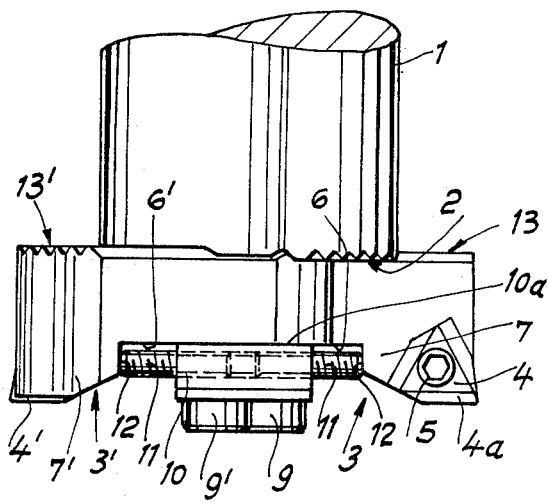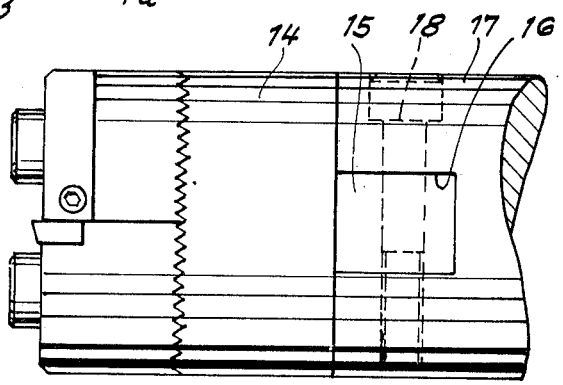

MOUNTINGS FOR BORING TOOL BITS

FIELD OF THE INVENTION

This invention relates to mountings for boring tool bits.

BACKGROUND OF THE INVENTION

It is known to provide a bore rod or the like with two cutting bits projecting over the forward end of the bore rod and displaced through 180° relative to each other each mounted on a cutting bit carrier which is radially adjustable relative to the bore rod, is guided on a toothing on the bore rod, extends in the direction of adjustment at right angles to the axis of the bore rod, and has parallel teeth, by means of an identical toothing, and which can be fixed relative to the bore rod by means of a clamping screw pausing through an oblong hole in the cutting bit carrier and engaging on the bore rod, there being provided for the radial adjustment of the cutting bit carrier, in each case, an adjusting screw extending in the direction of the toothing and engaging with the cutting bit carrier.

Bore rods of this type provided with two cutting bits displaced through 180° relative to each other, or also tool holders arranged on bore rods so as to be interchangeable, usually serve in this construction for the rough working of bores. Because of the high forces occurring in such processes they must be designed to be very stable. Bore rods with two cutting bits displaced through 180° relative to each other have the basic advantage, compared with tools with one cutting bit, that they can be mounted with double velocity of feed since each cutting bit provides for one removal of swarf. In order to make the edge life of the two cutting bits as near equal as possible the bits must be mounted with equal loading, that is, they must produce the same removal of swarf. For this it is necessary that their effective cut in the axial direction should be arranged to be in a common radial plane and their cutting edges must be at the same distance from the axis of the bore rod. In addition, radial adjustment of the cutting bit carrier is necessary so that different diameters of bore can be worked.

In a known bore rod of the type described in the introduction the bore rod has two recesses displaced through 180° relative to each other at its forward end. The surfaces of these recesses run in a wedge formation towards the forward end of the bore rod. In each of these surfaces there is provided a toothing with parallel teeth which extend at right angles to the axis of the bore rod. Each of the cutting bit carriers is provided with an oblong hole which also extends in the direction of the teeth, and each carrier can be clamped by means of a clamping screw with the interposition of an annular plate. The cutting bit carriers have, in addition,, prolongations projecting beyond the toothing in the axial direction on to which the individual cutting bits are fixed interchangeably, by means of a screw in each case. Fabrication of the two toothings in the recesses on the bore rod entails considerable manufacturing costs. In fact, not only must the recesses be milled out of the cylindricall bore rod but the toothings must also be milled or ground out subsequently. Since the toothings are arranged on different sides of the bore rod care must be taken here that the toothings are not mutually displaced in the axial direction, since in this case the cutting bits would also lie outside a single radial plane. The same is also true for the toothings on the cutting bit carriers. Thus very small tolerances must be observed in manufacture which increases the manufacturing costs. In addition, each cutting bit carrier projects relatively far in the axial direction as measures from its point of attachment by the clamping screw. Added to this, the bore rod is weakened by the recesses. The known tool therefore has low stability which is a disadvantage, particularly in roughing work. In addition in the known bore rods the cutting bit can only be adjusted over a relatively small range.

Bore rods are also known in which the bore rod has a transverse recess at its forward end. Internal toothings, extending at right angles to the axis of the bore rod, are again provided on the surface extending parallel to the axis of the bore rod. In practice these constructions form a kinematic reversal of the previously described bore rods and have the same disadvantages.

In addition bore rods are also known which have a dovetail guide extending along a diameter. The cutting bit carriers are provided with a similar dovetail guide and are fixed by means of a clamping screw extending at right angles to their direction of adjustment. Manufacturing costs for such a dovetail guide are however relatively high without the production of any advantages relative to the bore rod constructiondescribed previously. In particular, however, bore rods with dovetail guides have the disadvantage of large constructional dimensions in particular in the radial direction and a small range of adjustment of the cutting bit carrier relative to the diameter of the bore rod.

One object of the invention is to produce a bore rod or the like of the type described in the introduction with two cutting bit carriers which project over the forward end of the bore rod and which are displaced through 180° relative to each other where said bore rod is simpler in manufacture, more accurate and more stable. In addition an optimal range of adjustment of the cutting bit carriers relative to the diameter of the bore rod should be achieved.

This object is achieved according to the invention in that the toothing for the two cutting bit carriers on the forward surface of the bore rod or the like is provided, in its longitudinal direction, with continuous teeth in a common radial plane over the whole breadth of the forward surface and the cutting bit carriers have a similar toothing on the rear ends which are turned towards the forward face of the bore rod and that the clamping screws are arranged parallel to the axis of the bore rod.

The novel bore rods or the like and their cutting bit carriers are particularly simple to manufacture. Since the toothing for both cutting bit carriers is provided on the forward face no errors can arise in the axial direction. The toothing can be easily fabricated in particular when it, preferably, extends over the whole forward face of the bore rod or the like. The toothing for both cutting bit carriers can be produced in one working operation. The novel tool is thus simpler to manufacture and also more accurate. In addition, the bore rod or the like is not weakened by any recesses and the clamping screws engage in the immediate neighbourhood of the cutting bits so that an optimal stability is produced. In addition as great as possible a range of adjustment of the cutting bit carriers is also produced since the toothing extends over the whole diameter of the bore rod or the like and a maximal bearing area is thereby produced between the cutting bit carriers and the bore rod or the like.

BRIEF DESCRIPTION OF THE DRAWINGS

The invention will now be described in more detail, solely by way of example, with reference to the accompanying drawings in which:

FIG. 1 is a front view of a bore rod embodying the invention,

FIG. 2 is a first side view of the bore rod in the direction II of FIG. 1,

FIG. 3 is a plan view of the bore rod in the direction III of FIG. 2, and

FIG. 4 is a side view of a modified form of embodiment of the invention.

DETAILED DESCRIPTION

In FIGS. 1, 2 and 3 of the drawings a bore rod 1 is shown embodying the invention and has on its forward face a toothing 2 extending at right angles to the axis A—A of the bore rod with parallel teeth 2a. The teeth 2a are produced continuously over the whole breadth of the bore rod 1 where the toothing conveniently extends over the wholeforward face. Two cutting bit carriers 3,3' are arranged on the forward face so as to be radially adjustable. Both cutting bit carriers, as well as the other components attached to them and acting in conjunction with them, are designed to be completely similar and similar components are therefore given the same reference number in each case where, in each case, the second cutting bit carrier and each of its components are distinguished by means of an index apostrophe. The following description can thus be applied by analogy to the second cutting bit carrier.

The cutting bit carrier 3 is provided with a toothing 13, corresponding to the toothing 2, on its end which faces the forward face of the bore rod. This toothing is also produced continuously. The cutting bit carrier 3 has an interchangeable cutting bit 4, of hard metal or the like, which is attached by a screw 5. At its forward end in the axial direction the cutting bit carrier has a supporting surface 6 which is set back axially in the axial direction relative to the effective cutting edge 4a. Neighbouring on this supporting face 6 the cutting bit carrier has a projecting extension 7 which carries the cutting bit 4. In the neighbourhood of the supporting face 6 the cutting bit carrier 3 is provided with an oblong hole 8 which extends parallel to the teeth 2a of the toothing. A clamping screw 9, which is screwed into the bore rod and which extends parallel to the axial direction A—A of the bore rod 1, passes through this oblong hole 8.

In order that the cutting bit carrier 3,3' is not displaced during tightening of the clamping screw 9 or 9' it is convenient to provide for both cutting bit carriers a common clamping plate 10 which extends at right angles to the direction V of adjustment of the carriers, and against which the supporting surface 6 of each cutting bit carrier, extending parallel to the forward face of the bore rod, is applied. The supporting surface 6 of the cutting bit carrier 3 is set back by about the thickness S of the clamping plate 10 relative to the effective cutting edge 4a, so that the clamping plate does not project in the axial direction and cannot interfere with the operational movement of the tool.

Advantageously, the toothing 2 extends over the whole forward face of the bore rod 1 and the height H of each cutting bit carrier 3,3' at right angles to the cutting surface of the cutting bit 4 corresponds to about half the diameter D of the bore rod 1. In this way maximal contact and guide surface area is achieved between the cutting bit carriers 3,3' and the bore rod. This maximal contact surface area also makes possiblea maximal possibility of the radial adjustment of the cutting bit carriers 3,3'. For the same reason the cutting bit carriers have their surfaces 3a or 3'a facing towards each other so designed that the cutting bit carriers do not overlap in the direction V of adjustment. Conveniently, for reasons of manufacturing technology, the cutting bit carriers are here designed with their facing surfaces 3a or 3'a plane. They may also make contact at the surfaces 3',3'a which face each other for mutual support.

A female screw thread running parallel to the direction V of adjustment is provided adjacent each cutting bit carrier 3,3' in the clamping plate 10 to accept an adjusting screw 11,11'. The outer end of each adjusting screw is supported against a counter surface 12,12' of the extension 7,7'. In order to ensure a well-defined contact ratio between the clamping plate 10 and the two cutting bit carriers 3,3' and also to simplify the carriers' adjustment in the radial direction, the clamping surfaces 10a of the clamping plate 10 which are applied against the supporting surface 6,6' are conveniently designed to be slightly concave in the longitudinal direction of the clamping plate or are somewhat cut away at the centre, so that the clamping plate 10 is substantially applied against the supporting surfaces 6,6' of the cutting bit carrier 3,3' by means of its external ends.

In order that the cutting bit carriers should be mutually interchangeable and that they cannot be confused on dismounting the bore rod it is convenient, as illustrated in FIGS. 1 and 2, to arrange the centre of a tip or the root of a tooth on a diameter of the bore rod. The toothing is conveniently a V-shaped toothing.

The adjustment of the cutting bit carriers 3,3' with the cutting bits 4,4' takes place, for example, in such a way that the clamping screw 9' of the cutting bit carrier 3' is left tight and at first only the clamping screw 9 of the cutting bit carrier 3 is loosened. Because of the concave design of its clamping surface 10a the clamping plate still applies a slight pressure to the cutting bit carrier 3 as well. The latter can now be adjusted outwards in the radial direction by the desired amount by means of the adjusting screw 11. When the cutting edge of the cutting bit 4 has reached the desired radial position the clamping screw 9 is tightened so that the clamping plate 10 prevents an undesired movement of the cutting bit carrier 3 radially outwards. Next the clamping screw 9' is loosened and the cutting bit carrier 3' is adjusted as described above. After completion of the adjustment and tightening of the clamping screw 9' the cutting edges of the two cutting bits 4,4' lie on the same diameter and also in the same radial plane. The bore rod is ready for working purposes. As can be seen from the drawing the possibility of adjustment of the cutting bit carriers 3,3' is very high in relation to the diameter of the bore rod. For instance, for a bore rod diameter D of 50 mm. the smallest workable bore diameter is 60 mm and the greatest 92 mm, where a stable holding of the cutting bit carrier is also ensured in this case.

The present invention is of course not limited to the example of embodiment illustrated in FIGS. 1, 2 and 3. Thus it is also possible, for example, to employ the invention for other tool holders for boring purposes. According to FIG. 4, for example, the toothing on the forward face could also be arranged, instead of on a bore rod, on a tool holder 14 which itself engages by means of an extension 15 in a recess 16 on a bore rod 17 and is secured there by means of a screw 18. Various working-up tools for rough or for fine work could be inserted in turn in the recess 16. The attachment of the cutting bits to the tool holder 14 is the same as is described above.

What we claim is:

1. A mounting for a pair of boring tool cutting bits, the mounting being such that the two cutting bits, when present, project beyond a forward end of a mounting member and are displaced through 180° relative to each other, each being mounted on a respective cutting bit carrier which is radially adjustable relative to and guided on a toothing on the mounting member, the said toothing extending in the direction of adjustment at right angles to the rotary axis of the mounting member and having parallel teeth, by means of a similar toothing and which can be fixed relative to the mounting member by means of a clamping screw passing through an oblong hole in the cutting bit carrier and engaging with the mounting member, there also being provided for the radial adjustment of the cutting bit carrier, in each case, an adjusting screw engaging with the carrier and extending in the direction of the toothing, and wherein the toothing for the two cutting bit carriers is provided on the forward face of the mounting member in a common radial plane with continuous teeth running across the whole breadth of the forward face, and the cutting bit carriers have a similar toothing on their rear ends facing towards the said forward face, and that the clamping screws are arranged parallel to the said rotary axis.

2. A mounting according to claim 1, wherein the toothing of the mounting member covers the whole forward face of the bore rod and the height of each cutting bit carrier at right angles to the cutting surface of the cutting bit is about half the diameter of the mounting member, the mounting member being of circular cross-section.

3. A mounting according to claim 2, wherein the cutting bit carriers do not overlap each other in their direction of adjustment.

4. A mounting according to claim 3, wherein the cutting bit carriers are designed to be plane at their surfaces which face each other.

5. A mounting according to claim 4, wherein the cutting bit carriers make contact with their surfaces which face each other.

6. A mounting according to claim 1, wherein a plate is provided between a head on each clamping screw and the respective cutting bit carrier, the said plate being a common clamping plate extending parallel to the direction of adjustment and applied against a supporting surface of each cutting bit carrier which extends parallel to the front face of the mounting member.

7. A mounting according to claim 6, wherein the supporting surface of each cutting bit carrier is set back axially by about the thickness of the clamping plate relative to the effective cutting edge of the cutting bit, when present, and the cutting bit carrier has an extension neighbouring on the supporting surface, which projects similarly from the supporting surface in the axial direction and which carries the cutting bit when present.

8. A mounting according to claim 7, wherein a female screw thread to accept the adjusting screw is provided in the clamping plate for each cutting bit carrier and extends parallel to the direction of adjustment, the external end of said screw being supported on a counter surface of the said extension.

9. A mounting according to claim 8, wherein the clamping surfaces of the clamping plate which are applied against the supporting surfaces are designed to be slightly concave or somewhat cut away at the centre so that the clamping plate is substantially applied against the supporting surfaces of the cutting bit carriers by means of its outer ends.

10. A mounting according to claim 1, wherein the centre of one tip or of the one root of a tooth is arranged on a diametrical line of the mounting member.

11. A mounting according to claim 1, wherein the toothings are V-shaped toothings.

12. A mounting according to claim 1, wherein the mounting member is a bore rod.

* * * * *